US008450707B1

(12) United States Patent
Brindza et al.

(10) Patent No.: US 8,450,707 B1
(45) Date of Patent: May 28, 2013

(54) THERMAL NEUTRON SHIELD AND METHOD OF MANUFACTURE

(75) Inventors: Paul Daniel Brindza, Yorktown, VA (US); Bert Clayton Metzger, Seaford, VA (US)

(73) Assignee: Jefferson Science Associates, LLC, Newport News, VA (US)

( * ) Notice: Subject to any disclaimer, the term of this patent is extended or adjusted under 35 U.S.C. 154(b) by 0 days.

(21) Appl. No.: 13/065,437

(22) Filed: Mar. 22, 2011

(51) Int. Cl.
*G21F 1/00* (2006.01)
*G21F 3/00* (2006.01)
*C09K 3/00* (2006.01)

(52) U.S. Cl.
USPC .................... 250/518.1; 106/18.13; 106/18.3; 106/628; 106/636; 106/717; 588/12; 252/504; 252/519.52; 252/520.22; 252/521.4; 252/521.5

(58) Field of Classification Search
USPC ............. 250/505.1, 515.1, 517.1, 518.1, 526; 252/478, 504, 516, 521.4; 106/18.13, 18.3, 106/717, 815, 816, 606, 628, 636, 654, 664, 703, 709, 713, 784, 205.3, 169.16, 170.19, 176.1; 588/1-4, 12, 257, 261
See application file for complete search history.

(56) References Cited

U.S. PATENT DOCUMENTS 3,361,684 A * 1/1968 Chvatal ......................... 252/478
4,123,392 A * 10/1978 Hall et al. ..................... 252/478
5,156,804 A * 10/1992 Halverson et al. ............ 376/419
5,416,333 A * 5/1995 Greenspan ................. 250/515.1
5,786,611 A * 7/1998 Quapp et al. ............... 250/515.1
6,166,390 A * 12/2000 Quapp et al. ............... 250/506.1
6,630,683 B2 * 10/2003 Vanvor ....................... 250/518.1
2002/0134951 A1 * 9/2002 Vanvor ....................... 250/515.1

* cited by examiner

*Primary Examiner* — Bernard E Souw

(57) ABSTRACT

A thermal neutron shield comprising concrete with a high percentage of the element Boron. The concrete is least 54% Boron by weight which maximizes the effectiveness of the shielding against thermal neutrons. The accompanying method discloses the manufacture of Boron loaded concrete which includes enriching the concrete mixture with varying grit sizes of Boron Carbide.

10 Claims, 1 Drawing Sheet

| Material | Cubic Yard Weight |
|---|---|
| | |
| Portland Cement | 560 |
| Micron3 | 100 |
| Boron Carbide (Coarse) | 1675 |
| Boron Carbide (Fine) | 733 |
| Water | 51.0 |
| AEA15 | 0 |
| Viscosity Modifier | 26.4 |
| Viscocrete® 2100 | 495 |

| Material | Cubic Yard Weight |
|---|---|
| | |
| Portland Cement | 560 |
| Micron3 | 100 |
| Boron Carbide (Coarse) | 1675 |
| Boron Carbide (Fine) | 733 |
| Water | 51.0 |
| AEA15 | 0 |
| Viscosity Modifier | 26.4 |
| Viscocrete® 2100 | 495 |

THERMAL NEUTRON SHIELD AND METHOD OF MANUFACTURE

The United States of America may have certain rights to this invention under Management and Operating Contract No. DE-AC05-84ER 40150 from the Department of Energy.

FIELD OF THE INVENTION

The present invention relates to a method of shielding thermal neutrons through the use of concrete which incorporates a high percentage of the element Boron.

BACKGROUND OF THE INVENTION

Neutron radiation may be generated as a result of a variety of nuclear reactions or interactions. More specifically, devices such as particle accelerators and nuclear reactors may emit neutrons during operation. A portion of such neutron emissions may subsequently classify as thermal neutrons. Neutrons, including thermal neutrons, have a deleterious effect on both living matter and inanimate objects. Thermal neutrons may also participate in neutron activation thereby inducing radioactivity in environmental materials, equipment, and structures.

It is of vital importance, therefore, to provide adequate shielding from any sources of neutron radiation. Various methods and devices are known to be capable of providing shielding from such radiation.

It is known that elemental Boron has beneficial properties when used as a component of shielding devices. The highest density Boron possible is desirable in order to maximize the effectiveness of the shielding. As a result, shielding arrangements such as dry-packed Boron carbide in metal boxes, Boron-loaded polyethylene plastic sheets, and Boron-loaded drywall have been disclosed in the art. Unfortunately, none of the foregoing technologies or systems are able to achieve a high Boron density. Further, all such technologies are traditionally quite expensive to deploy. It is therefore preferable to have a cost-effective method of shielding that is able to take advantage of the characteristics of the element Boron so as to provide an adequate amount of shielding from thermal neutrons.

When such shielding takes the form of concrete, it can be incorporated into the structure of a building or any portion thereof. In such a case, the concrete must be of sufficient strength to satisfy the structural requirements of the building elements.

OBJECT OF THE INVENTION

It is an object of the invention to provide a concrete mix and a method of making same which can be used as an effective but low cost thermal neutron shield, and, further, possess sufficient compressive strength and other such characteristics for a variety of building and construction applications.

SUMMARY OF THE INVENTION

The present invention describes a concrete mix incorporating Boron which can be used as a thermal neutron shield. Boron, in the form of Boron Carbide of varying grit sizes, is added to the concrete mixture in place of the traditionally found ingredients of sand and aggregate. In a preferred embodiment of the invention, the total Boron Carbide content of the mixture includes 80% coarse Boron Carbide particles and 15% fine Boron Carbide particles. The resulting Boron content of the finished concrete exceeds that of dry-packed Boron Carbide powder. The concrete mix provides efficient and inexpensive shielding for thermal neutrons that also serves as an excellent structural building material.

DETAILED DESCRIPTION

It is recognized in the art that the chemical element Boron may be used in various fashions in order to provide radiation shielding. Boron is particularly suitable for neutron shielding applications as it has one of the highest neutron absorption cross-sections of all elements. The ability of Boron to effectively capture neutrons makes it ideal for applications involving thermal neutron shielding. A cost-effective method of shielding thermal neutrons can therefore be realized by making concrete with a high percentage of Boron.

It is observed that the compound Boron Carbide ($B_4C$) contains seventy-six percent (76%) Boron by weight and is the highest Boron-containing compound known. Boron Carbide is commonly used as an abrasive, in anti-ballistic materials, and in industrial applications. It is a hard granular material which can be obtained in various grit or particle sizes.

As set forth herein, Boron Carbide can be substituted for the sand and aggregate in concrete in order to make a Boron-rich concrete suitable for shielding thermal neutrons. The concrete mixture includes a high Boron density while still maintaining high strength. Further, such concrete possesses excellent workability properties.

Traditional concrete mixtures for construction and other such uses are well known in the art. Most, if not all, such traditional mixtures include a fine aggregate component which generally makes up a substantial portion of the concrete mixture.

The concrete mixture disclosed herein substitutes Boron Carbide in place of the fine aggregate or sand. More specifically, Boron Carbide of at least two different particle sizes is used in order to maximize the Boron density in the finished product. A coarse grade and a fine grade of Boron Carbide are included in the mixture. The fine grade consists of particles sized between 75-80 microns. The coarse grade consists of particles sized between 140-145 microns. In a preferred embodiment, the total Boron Carbide consists of eighty percent coarse grade and twenty percent fine grade. A higher percentage of fine grade Boron Carbide may also be used whereby the total Boron Carbide in the mixture would consist of seventy percent coarse grade and thirty percent fine grade.

Table A shows an illustrative mixture of ingredients in a preferred embodiment:

TABLE A

| Material | Cubic Yard Weight |
|---|---|
| Portland Cement | 560 |
| Micron3 | 100 |
| Boron Carbide (Coarse) | 1675 |
| Boron Carbide (Fine) | 733 |
| Water | 51.0 |
| AEA15 | 0 |
| Viscosity Modifier | 26.4 |
| Viscocrete ® 2100 | 495 |

The water is also an important component of the shielding features of the concrete mix. The water assists in thermalizing the neutrons which are then effectively absorbed by the Boron content of the concrete.

It will be recognized that volume, weight, or percentage of ingredients other than the Boron Carbide, e.g., viscosity modifier or Visocrete® 2100, may be varied, as necessary, in order to modify the workability of the concrete or to alter any characteristics of the concrete other than the Boron content.

The use of varying Boron Carbide grit sizes is essential in order to achieve a high density of Boron Carbide content in the final concrete product. Prior art dry-packed Boron Carbide power is limited to approximately fifty percent (50%) of the density of the Boron Carbide. The Boron-rich concrete includes other components which serve to dissipate excess charge and thereby suppress the electrostatic repulsion between the grains. This permits a tighter, denser compaction of the Boron Carbide. In comparison, the Boron-rich concrete is able to achieve a Boron density of approximately fifty-four percent (54%) Boron content compared to that of dry-packed Boron Carbide powder which is limited to approximately fifty percent (50%) of the density of the Boron Carbide.

The varying grit size also improves the workability, including the pourability and pumpability, of the concrete so it can be used in a traditional manner with no extra effort, difficulty, or equipment. The Boron-rich concrete possesses a minimum of 5600 psi compressive strength which makes it suitable for most structural applications where thermal neutron shielding is also required. The high Boron density, high compressive strength, and excellent concrete properties were arrived at by optimizing the ratio of Boron Carbide grain sizes and the amount of other materials to the mixture.

This Boron-rich concrete provides a cost-effective method of neutron radiation shielding. Concrete is a staple, low cost building material. The Boron Carbide additive used herein is also relatively inexpensive. The Boron-rich concrete is thus an easily prepared material that is inexpensive to apply and utilize. Further, it can be formed into any structural element or shape in the same manner as traditional concrete.

Potential industrial applications would include new nuclear reactor power plants, nuclear detection or fabrication facilities, buildings or rooms containing nuclear medical devices, particle beam facilities, high density shielding for nuclear propulsion systems, and any other application where the reduction of thermal nuclear radiation must be accomplished. The fact that the shielding can be actually integrated into the building structure serves to reduce overall costs and the necessary footprint of adequate levels of shielding.

What is claimed is:

1. A thermal neutron shielding material comprising a concrete mixture having a composition including Boron Carbide particles of at least two different particle sizes.

2. The neutron shielding material of claim 1 wherein said two different particle sizes comprise a first particle size essentially within the range of 140-145 microns and a second particle size essentially within the range of 75-80 microns.

3. The neutron shielding material of claim 2 wherein said Boron Carbide particles in said composition consist of 80% of said first particle size and 20% of said second particle size.

4. The neutron shielding material of claim 2 wherein said Boron Carbide particles in said composition consist of 70% of said first particle size and 30% of said second particle size.

5. The neutron shielding material of claim 2 wherein said material possesses such characteristics so as to be suitable for commercial construction.

6. The neutron shielding material of claim 5 wherein said material possesses a compressive strength of 5600 psi or better.

7. The neutron shielding material of claim 2 wherein said material comprises no less than 54% Boron by weight.

8. A method of constructing a neutron shielding material comprising:

preparing a concrete mixture including Boron Carbide particles of at least two particle sizes; and curing said mixture so as to obtain a finished concrete product.

9. The method of claim 8 wherein said Boron Carbide particles of at least two particle sizes comprise a first particle size essentially within the range of 140-145 microns and a second particle size essentially within the range within the range of 75-80 microns.

10. The method of claim 9 wherein said finished concrete product comprises no less than 54% Boron by weight and possesses a compressive strength of 5600 psi or better.

* * * * *